United States Patent [19]

Evans et al.

[11] Patent Number: 5,881,119
[45] Date of Patent: Mar. 9, 1999

[54] APPARATUS FOR HANDLING NUCLEAR FUEL RODS

[75] Inventors: David L. Evans, Harbour; Terrence Wilcock, Warrington; Alan Blackwell, Harbour, all of United Kingdom

[73] Assignee: British Nuclear Fuels plc, Cheshire, United Kingdom

[21] Appl. No.: 981,891

[22] PCT Filed: Jun. 7, 1996

[86] PCT No.: PCT/GB96/01354

§ 371 Date: Mar. 6, 1998

§ 102(e) Date: Mar. 6, 1998

[87] PCT Pub. No.: WO97/01175

PCT Pub. Date: Jan. 9, 1997

[30] Foreign Application Priority Data

Jun. 21, 1995 [GB] United Kingdom .................. 9512643

[51] Int. Cl.⁶ .......................... G21C 3/334; G21C 21/00
[52] U.S. Cl. ............................................................ 376/261
[58] Field of Search .................................... 376/260, 261, 376/269

[56] References Cited

U.S. PATENT DOCUMENTS 4,713,199  12/1987  Spilker et al. ........................... 376/272

FOREIGN PATENT DOCUMENTS

| 0 072 356 | 2/1983 | European Pat. Off. . |
| 0 107 889 | 5/1984 | European Pat. Off. . |
| 0 209 262 | 1/1987 | European Pat. Off. . |
| 0 361 794 | 4/1990 | European Pat. Off. . |
| 2428892 | 1/1980 | France . |
| 946306 | 8/1994 | South Africa . |
| 1 225 951 | 3/1971 | United Kingdom . |
| 2 023 911 | 1/1980 | United Kingdom . |
| 2 096 937 | 10/1982 | United Kingdom . |
| 95/06318 | 3/1995 | WIPO . |

*Primary Examiner*—Daniel D. Wasil
*Attorney, Agent, or Firm*—Nixon & Vanderhye P.C.

[57] ABSTRACT

An apparatus for handling nuclear fuel rods, which include a mixed oxide fuel material, and for constructing fuel assemblies from the fuel rods, includes a store (9) constructed from radiation shielding material. The store includes a number of channels (10), each of which is adapted to receive a magazine (2) containing fuel rods. Removal and insertion of magazines from and into the channels is effected by a handling machine (29) which is remotely and automatically operated. Each of the channels is closed by a plug (11) which can be removed and inserted by the handling machine. The handling machine is able to remove a magazine from a selected channel and to deliver the magazine to either of two fuel assembly lines (16, 21). Each assembly line constructs a different type of fuel assembly from that of the other assembly line, and each assembly line is arranged in a separate shielded enclosure (15, 24).

29 Claims, 9 Drawing Sheets

APPARATUS FOR HANDLING NUCLEAR FUEL RODS

The present invention relates to apparatus for handling fuel rods of the type used in nuclear fuel assemblies and for constructing fuel assemblies incorporating the fuel rods. In particular the invention relates to apparatus for handling fuel rods containing mixed oxide fuel material having a hazardous component and for constructing fuel assemblies of different types from such fuel rods.

The use in a nuclear reactor of fuel rods manufactured from a mixture of uranium and plutonium oxides is desirable since economic use is made of the plutonium recovered from the reprocessing of spent uranium oxide nuclear fuel. However, the presence of the hazardous plutonium component in the fuel rods gives rise to difficulties in handling them. It will be apparent that it would be dangerous to handle directly the plutonium-containing fuel rods because of the potential danger to the health of the operatives. Therefore, the handling of plutonium-containing fuel rods must be carried out within shielded enclosures using equipment operated automatically under the control of operatives at a remote location.

It is an object of this invention to provide an apparatus which facilitates the handling of fuel rods and the construction of nuclear fuel assemblies of different types from the fuel rods, particularly fuel assemblies including fuel rods containing mixed oxide fuel material having a hazardous component.

According to the present invention there is provided an apparatus for handling fuel rods for use in nuclear fuel assemblies, the apparatus comprising a store means constructed from radiation shielding material and having a plurality of elongate channels extending in parallel relationship, each of said channels being adapted to receive a magazine containing at least one fuel rod, and a remotely and automatically operated magazine handling means operable to insert a magazine into or to remove a magazine from a selected one of said channels.

Preferably the magazine handling means comprises a housing constructed from radiation shielding material adapted to accommodate a magazine.

Each of said channels is preferably closed at one end by a removable closure means constructed from radiation shielding material and means are provided on said magazine handling means for removing the closure means from or inserting the closure means in the channel.

In a preferred embodiment guide means are provided on the magazine handling means for receiving the closure means.

The guide means for receiving the closure means may comprise a pair of parallel guide bars, and wherein rollers are provided on the closure means for running along the guide bars.

The housing and said guide means may extend in parallel relationship, the housing having an open end adjacent to said guide means through which a magazine can be inserted or removed.

Preferably locking means are provided on the closure means for securing and releasing the closure means in the channel, and wherein operating means are provided on the magazine handling means for actuating said locking means.

The locking means may comprise at least one catch which is extendible from an external surface of the closure means to secure the closure means in the channel and is retractable beneath said external surface to release the closure means from the channel, the catch being operatively connected to a rotatable toothed pinion, and the operating means being engageable with the pinion to cause rotation thereof whereby the catch can be extended and retracted.

Suitably, further guide means are provided in the channel to facilitate the removal and insertion of the closure means, the further guide means comprising a guide bar extending along the channel at each side thereof, and wherein the rollers provided on the closure means are arranged to run along the guide bars during removal and insertion of the closure means.

Preferably coupling means are provided on said closure means whereby the closure means can be coupled to the magazine.

The magazine preferably comprises an elongate casing of rectangular cross-section and having a closed end and an open end, the open end being normally closed by a door means.

A latch assembly may be provided on the magazine at the closed end thereof, the latch assembly being operated by the coupling means associated with the closure means whereby the magazine can be secured to or released from the channel.

In a preferred embodiment of the invention the magazine handling means comprises a lower bogie provided with a first set of wheels adapted to run along a first pair of rails.

The magazine handling means preferably comprises an upper bogie provided with a second set of wheels adapted to run along a second pair of rails provided on the lower bogie, the second pair of rails extending substantially transversely with respect to said first pair of rails.

The said housing and the guide means may be arranged on a table mounted for rotation on the upper bogie.

Preferably means are provided on the magazine handling means for raising and lowering the table with respect to said lower bogie.

The apparatus preferably further comprises first and second substantially parallel radiation shielding walls defining a passage therebetween, the first pair of rails being arranged to run along said passage, and access openings provided in each of said first and second walls, the arrangement being such that the magazine handling means is operable to run along the first pair of rails and to present the open end of the housing to an access opening in either of said first and second walls.

A third pair of rails may be arranged to extend in a direction transversely with respect to the direction of the first pair of rails, the third pair of rails being adapted to receive the second set of wheels provided on the upper bogie, whereby the magazine handling means can present the open end of the housing to the channels of the store means.

Preferably, the apparatus further includes a first fuel assembly line comprising equipment for constructing fuel assemblies of a first type, a second fuel assembly line comprising equipment for constructing fuel assemblies of a second type, the magazine handling means being operable to remove a magazine from a selected one of said channels of the store means and to deliver said magazine to either of said first and second fuel assembly lines.

Preferably each fuel assembly line is arranged in a separate shielded enclosure, each enclosure having an access opening normally closed by a door member, catch means located adjacent the access opening and a docking mechanism provided on the magazine handling means and cooperable with the catch means whereby said handling means can be docked adjacent the access opening.

A magazine removal means may be provided on said handling means, the removal means being operable to advance a magazine from the handling means and through the access opening into said shielded enclosure.

Advantageously, at least one of said first and second fuel assembly lines comprises a table means movable towards said access opening whereby to receive a magazine from said handling means.

Preferably clamping means are provided on said table means for securing a magazine thereto.

Each of the first and second fuel assembly lines may include a fuel rod pulling means operable to withdraw the fuel rods from said magazine.

Each of the first and second fuel assembly lines may include an assembly bench for supporting plurality of fuel assembly components, said assembly bench comprising a plurality of clamp means for securing said fuel assembly components to the assembly bench.

Preferably the fuel rod pulling means associated with one of said first and second fuel assembly lines is operable to withdraw the fuel rods from the magazine into said fuel assembly components.

The fuel rod pulling means associated with the other of said first and second fuel assembly lines may be operable to withdraw the fuel rods from the magazine onto a fuel rod transfer means, said fuel rod transfer means being operable to transfer the fuel rods to a pushing means by means of which said fuel rods are pushed into said fuel assembly components.

Each assembly bench preferably includes a pivotably mounted support to which the fuel assembly components are secured, the pivotably mounted support being operable to move said fuel assembly components to a vertical orientation.

At least one of said first and second fuel assembly lines may include a fuel handling machine for receiving the fuel assembly components in a vertical orientation from said pivotably mounted support, the fuel handling machine comprising an upper support means and a lower support means for engaging, respectively, upper and lower ends of the fuel assembly components, each of said upper and lower support means being arranged to run along associated track means.

Preferably the fuel rods comprise a fuel material formed from a mixture of uranium and plutonium oxides.

Embodiments of the invention will now be described, by way of example only, with reference to the accompanying drawings, in which.

Figure 1:
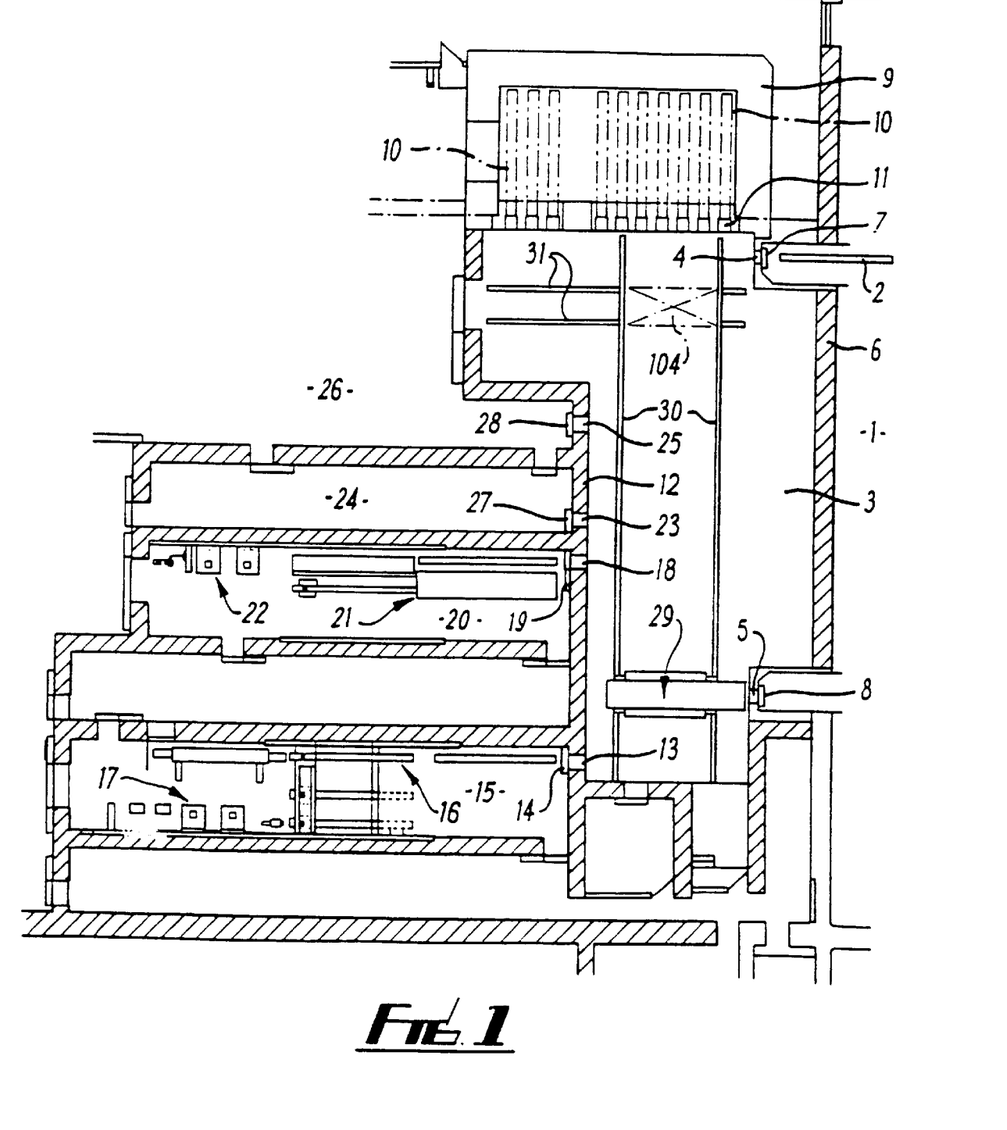
FIG. 1 is a diagrammatic plan view of a plant layout for handling nuclear fuel rods and constructing the rods to form fuel assemblies.

Referring to FIG. 1, a plant layout for handling nuclear fuel rods and constructing fuel assemblies therefrom is shown. The fuel rods are designed for use in two different types of fuel assembly and in a preferred embodiment one type of fuel assembly is intended for use in a pressurised water reactor and the other type is designed for use in a boiling water reactor. Each fuel rod comprises a material formed from a mixture of uranium oxide and plutonium oxide. The presence of plutonium in the fuel material gives rise to particular problems in the handling of the fuel rods and construction of the fuel assemblies in that adequate shielding requirements must be provided for the fuel rods during the handling, storage and fuel assembly operations. Furthermore, these operations must be carried out using machinery or equipment controlled automatically by personnel at a remote location.

The plant layout comprises an area 1 in which the mixed oxide fuel rods are manufactured and then loaded into magazines 2. The area 1 communicates with a magazine handling and storage area 3 by means of access openings 4, 5 provided in a radiation shielding wall 6 and normally closed by doors 7, 8 respectively. The fuel rods are manufactured in batches, each batch containing fuel rods having a specific quantity of uranium and plutonium oxides. It is therefore necessary to store the fuel rods temporarily until the required number of fuel rods containing the desired fuel composition for a fuel assembly is completed. For storing the fuel rods a magazine store 9 is provided at one end of the handling and storage area 3. The store 9 is constructed from radiation shielding material, for example, concrete, and comprises a plurality of elongate storage channels 10. Each storage channel 10 is closed at one end by a removable closure means in the form of a radiation shielding plug 11.

The magazine and storage area 3 has a further radiation shielding wall 12 located opposite to and extending parallel to the shielding wall 6. An access opening 13, normally closed by a slidable door 14, extends through the shielding wall 12 to provide access to a shielded enclosure 15 in which the fuel rods are assembled to form fuel assemblies of the type used in pressurised water reactors. Installed in the enclosure 15 are fuel assembly construction equipment 16 and inspection stations 17. Similarly, an access opening 18, normally closed by a slidable door 19, is formed in the shielding wall 12 to provide access to a shielded enclosure 20 in which the fuel rods are assembled into fuel assemblies of the type used in boiling water reactors. The enclosure 20 houses fuel assembly construction equipment 21 and inspection stations 22. An access opening 23, providing access to a maintenance area 24, and an access opening 25, providing access to a jobbing area 26, are also formed in the shielding wall 12. The access openings 23, 25 are normally closed by sliding doors 27, 28 respectively.

The magazines 2 containing fuel rods are transported between the various access openings 4, 5, 13, 23, 25 and the magazine store 9 by a magazine handling machine 29. Movement and operation of the machine 29 are controlled from a location remote from the area 3 so as to protect the operatives from radiation emitted by the fuel rods. The machine 29 runs along a first pair of rails 30 which are laid on the floor of the area 3 so as to extend parallel to the shielding walls 6, 12 along a passage formed between the walls. A further pair of rails 31, extending transversely with respect to the rails 30, enables the machine 29 to access the storage channels 10 of the store 9. The upper level of the rails 31 is higher than the upper level of the rails 30, for the purpose hereinafter described.

Figure 6:
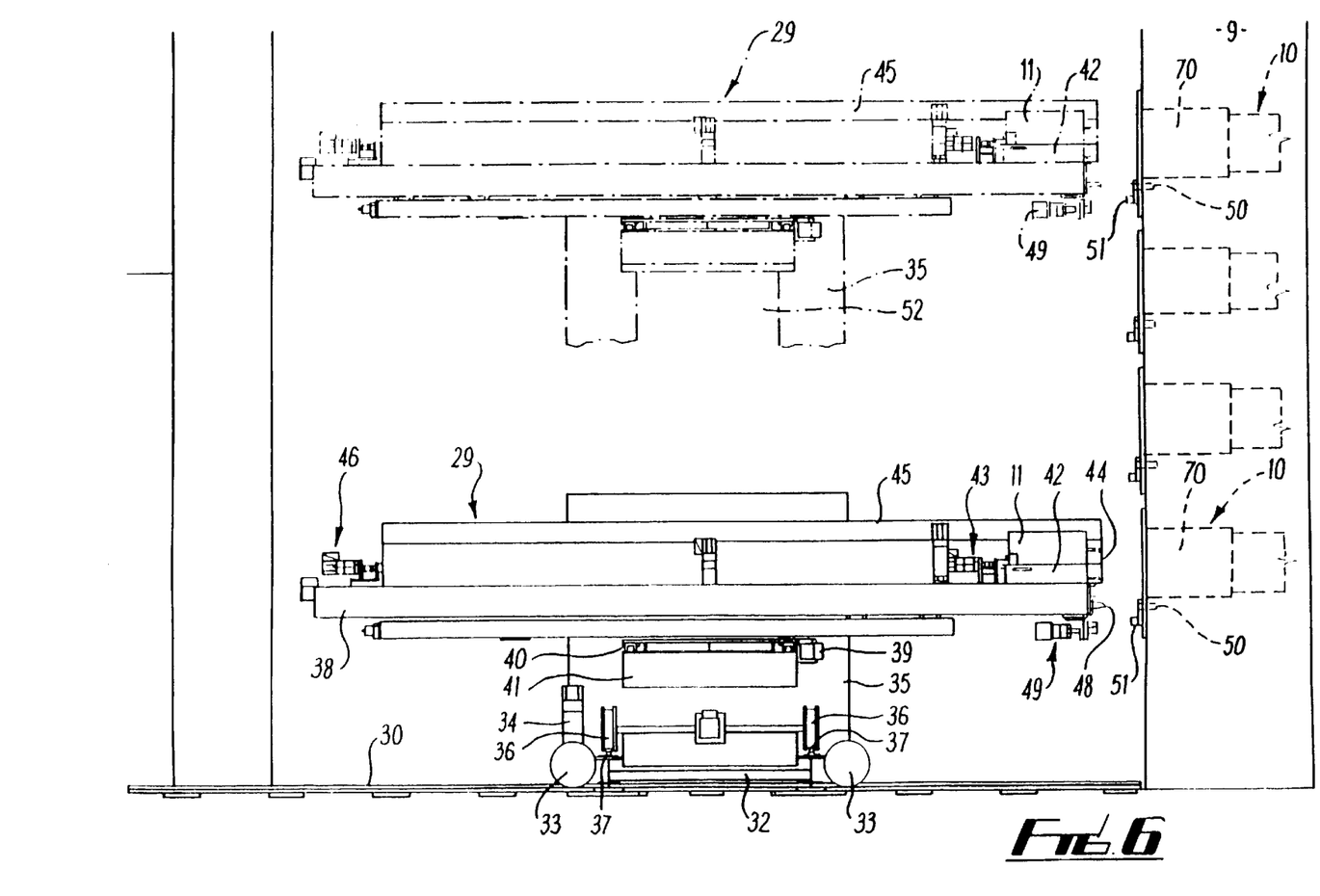
FIG. 6 is a side elevation of a magazine handling machine according to a preferred aspect of the invention.

Referring to FIG. 6, the magazine handling machine 29 comprises a lower bogie 32 which is provided with two pairs of wheels 33 adapted to run along the rails 30. An electric motor 34 is provided on the lower bogie 32 for driving one pair of the wheels 33. Supported on the lower bogie 32 is an upper bogie 35 which is equipped with two pairs of wheels 36 arranged to run along a pair of rails 37 provided on the lower bogie 32. A releasable locking mechanism (not shown) is provided for securing the upper bogie 35 to the lower bogie 32.

An upper table 38 is mounted on the upper bogie 35 for linear movement and for rotation about a vertical axis. Rotational movement of the upper table 38 is derived from an electric motor 39 which drives a ring 40 provided with rollers arranged to run on a support 41. At one end of the upper table 38 are guide means in the form of a pair of parallel guide bars 42 for receiving a plug 11 upon removal of the latter from the magazine store 9, as hereinafter described. A plug removal and latch operating mechanism 43 includes a rotatable latch 44 which is movable by the operating mechanism 43 for engaging a locking mechanism 80 (see FIGS. 11, 12 and 13) incorporated in the plug 11 for withdrawing and inserting a plug from and into a channel 10.

Figures 7, 8:
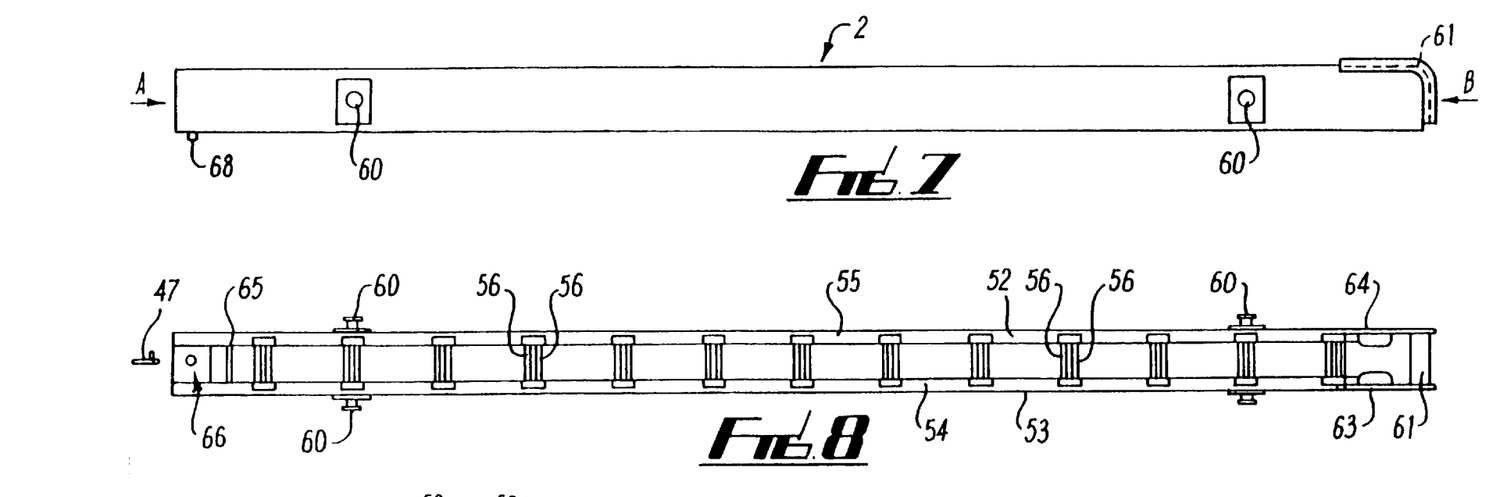
FIGS. 7, 8, 9 and 10 show, respectively, a side elevation, plan view, and end elevation of a fuel rod magazine according to a preferred aspect of the invention.
Figure 9:
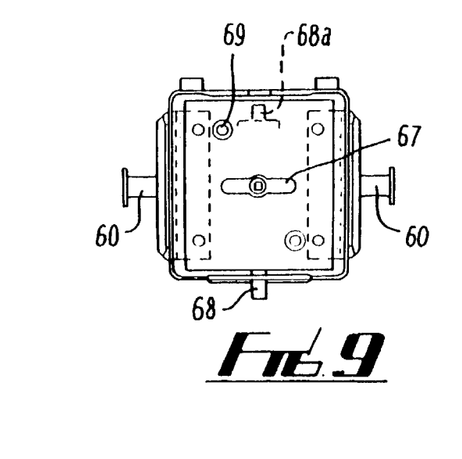
Figure 10:
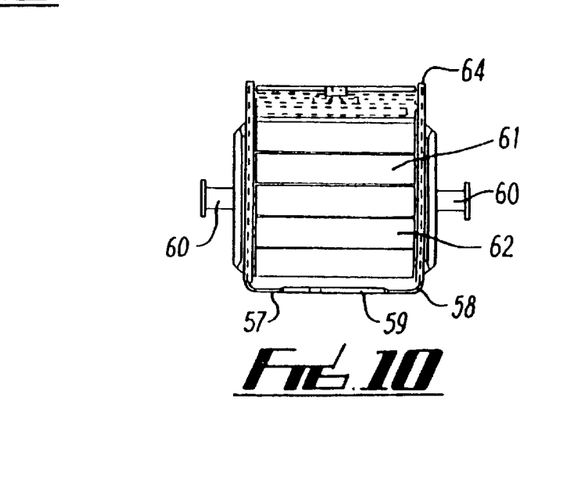

Extending along the upper table 38, parallel to and adjacent to the guide bars 42, is an elongate magazine housing 45. The housing 45, constructed from radiation shielding material, is of rectangular cross-section and has an open front end through which a magazine 2 can be passed into and out of the housing. Preferably the housing 45 is constructed from densified timber clad on the inside and outside with stainless steel sheet material. Air outlet holes (not shown) are provided in the magazine housing 45 to allow cooling air to circulate around a magazine 2 contained in the housing. At the rear end of the magazine housing 45 is a magazine removal and latch operating mechanism 46. The mechanism 46 includes a motor coupled to a worm screw drive extending along the housing 45. A rotatable latch 47 (see FIG. 8), similar to the latch 44, is moved by the worm screw drive so as to engage with a magazine 2 when moving a magazine into and out of the housing 45. Three location dowels 48 and a docking mechanism 49 are provided at the front end of the upper table 38. Typically, when presenting the upper table 38 to any of the access openings 4, 5, 13, 23, 25 or any of the store channels 10, the dowels 49 register with locating holes 50 while the docking mechanism 48 locks the machine 29 to a catch device, indicated by reference numeral 51. A hydraulic lifting device, generally indicated by reference number 52, is incorporated in the machine 29 for raising and lowering the upper table 38 with respect to the lower bogie 32. Thus, the upper table 38 can be raised to an upper position, indicated by chain-dot lines in FIG. 6, so that the machine 29 can insert a magazine 2 in and remove a magazine from a channel 10 in the top row of the store 9. The upper table 38 can also be moved to positions intermediate the upper and lower positions so that the middle two rows of channels 10 can be accessed.

A typical magazine 2 for accommodating complete or partial fuel rod arrays is described with reference to FIGS. 7, 8, 9 and 10. The magazine 2 is an elongate fabricated structure of rectangular cross-section and comprises two facing side channel sections 53. Each channel section 53 has an inwardly turned upper flange 54, 55 which are interconnected by a plurality of pairs of the plates 56. The inwardly turned lower flanges 57, 58 of the channel sections 53 are interconnected by a plurality of the plates 59. A pair of lifting trunnions 60 is provided on the channel sections 53 towards each end of the magazine. The open front end of the magazine 2 is normally closed by a sliding door 61 which is opened by means independent of the magazine to enable fuel rods to pass into and out of the magazine. The door 61 comprises a number of flexibly-interconnected slats 61 arranged for sliding movement in grooves provided in the inner surfaces of each of two side plates 63, 64. A fuel rod stop plate 65 is provided inside the magazine 2 for adjustment to various locations along the length thereof to suit the length of the fuel rods being handled. In use, the stop plate 65 serves to prevent excessive movement of the fuel rods when handling and transporting the magazine.

A latch assembly, generally indicated by numeral 66, is provided at the rear end of the magazine 2. The latch assembly 66 enables a magazine 2 to be locked in the store channel 10 or the magazine housing 45 on the magazine handling machine 29. Actuation of the latch assembly 66 can be achieved by means of the rotatable latch 47 associated with the magazine removal and latch mechanism 46 provided on the magazine handling machine 29. The latch 47 enters the latch assembly 66 by means of a slot 67 provided in the end surface of the magazine 2. Rotation of the latch 47 causes the extension and retraction of two catches 68, 68a. When either of the catches 68, 68a extends beyond the surface of the magazine 2 the magazine can be locked to the store channel 10 or the magazine housing 45. Retraction of either of the catches 68, 68a will release the magazine 2. Two location holes 69 are provided in the rear end surface for use in locating a store plug 11 when a magazine 2 and a plug are coupled together within a channel 10. The open structure of the magazine 2 enables cooling air to circulate around the fuel rods contained in the magazine.

Figure 11:
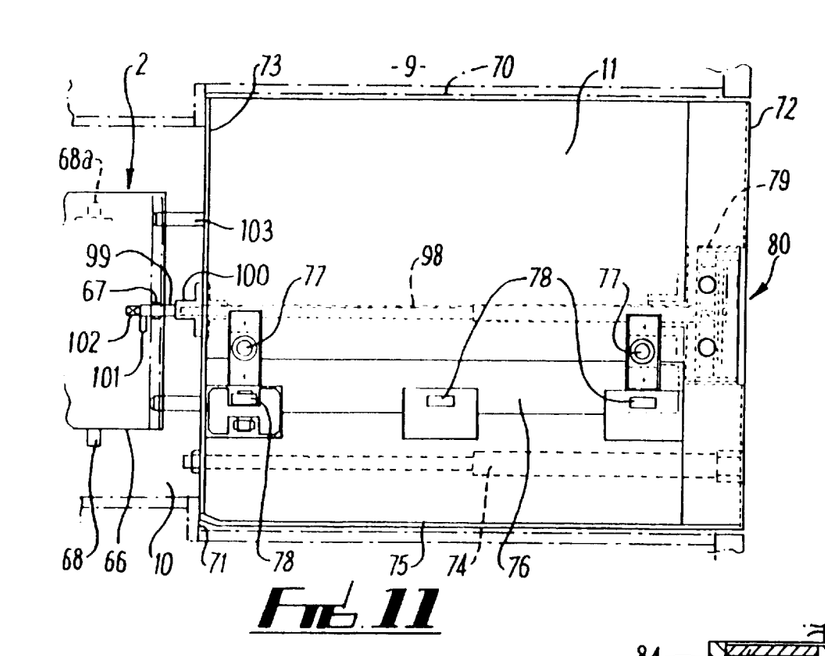
FIG. 11 is a side elevation of a closure means for a magazine storage channel.
Figure 12:
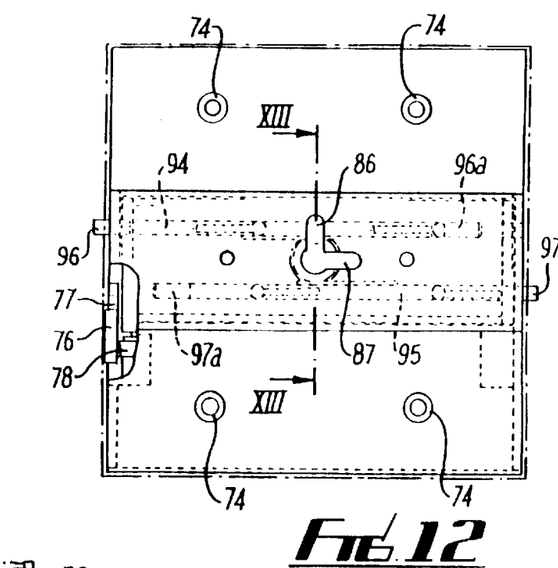
FIG. 12 is a front elevation of the closure means shown in FIG. 11.

Referring to FIGS. 11 and 12, a store plug 11 is shown coupled to a magazine 2 within a channel 10 of the store 9. The channel 10 is slightly enlarged at its front end to form a recess 70 for accommodating the plug 11. The recess has a shoulder 71 at its rear end, against which the plug 11 is located. Preferably, the plug 11 is constructed from radiation shielding material comprising laminations of densified timber extending transversely with respect to the longitudinal axis of the channel 10. The timber laminations are clamped between a front plate 72 and a rear plate 73 which are interconnected by four tie bars 74. A bottom plate 75 is provided underneath the timber laminations. To facilitate insertion and withdrawal, the plug 11 is supported for sliding movement within the recess 70 by guide rollers which run along guide bars 76 extending along the recess at either side of the plug 11. At each side of the plug 11 there are two rollers 77 disposed so as to run along an upper surface of the guide bar 76 and three rollers 78 arranged to run along an inner side surface of the guide bar.

Figure 13:
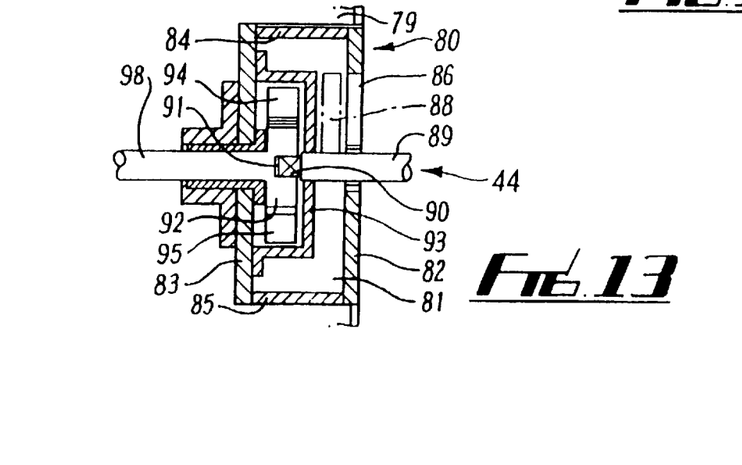
FIG. 13 is a cross-section on the line XIII—XIII shown in FIG. 12.

Located in a recess 79, extending into the plug 11 from a front end thereof, is a plug locking mechanism 80. As best seen in FIG. 13, the locking mechanism 80 is housed within a chamber 81 defined by a front plate 82, a rear plate 83 and upper and lower plates 84, 85. A vertical slot 86 and a horizontal slot 87 are provided in the front plate 82. The slots 86, 87 allow passage of a latch member 88, attached to a shaft 89 of the rotatable latch 44, into and out of the chamber 81 when inserting or withdrawing the latch. A square end 90 on the shaft 89 registers with a blind square hole 91 formed in a toothed pinion 92. The pinion 92 is housed in a recess formed between the rear plate 83 and a wall 93 and meshes with an upper toothed rack 94 and with a lower toothed rack 95. At each end of the upper rack 94 are catches 96, 96a and at each end of the lower rack 95 are catches 97, 97a. Rotation of the pinion 92 moves the upper and lower racks 94, 95 in mutually opposite directions so that the catches 96 can be extended beyond the sides of the plug 11. When extended, the catches 96, 96a, 97, 97a register with receiving holes (not shown) in the sides of the recess 70 to secure the plug 11 in position. When the catches 96, 96a, 97, 97a are retracted beneath the external surfaces of the plug 11, the plug is released.

A driven shaft 98 extends from the pinion 92 to the rear end of the plug 11 where it drivingly engages a magazine lock spindle 99 by means of a coupling 100. Projecting radially from the lock spindle 99 is a spindle member 101 which passes into the latch assembly 66 through the slot 67 provided at the rear end of the magazine 2 (see FIGS. 8 and 9). A square end 102 formed on the end of the spindle 99 operates the latch assembly 66 in a similar manner to that of the locking mechanism 80, as described above. Thus, on rotation of the spindle 99, either of the catches 68, 68a can be extended beyond the external surfaces of the magazine 2 to register with an associated receiving hole (not shown) thereby locking the magazine in position. When the catches are retracted beneath the surfaces of the magazine 2, the magazine is released. Extending rearwardly from the plug 11 are two magazine locating pins 103 which register with the location holes 69 provided at the rear end of the magazine 2 (see FIG. 9).

In operation, the magazine handling machine 29 is operated by instrumentation provided at a remote location to carry out automatically any of the following sequences:

a) receipt of a magazine 2 containing a partial or full complement of mixed oxide fuel rods from either of the access openings 4, 5 and to transport the magazine to a selected one of the channels 10 of the store 9.

b) delivery of a magazine 2 containing a partial or full complement of fuel rods from a selected one of the channels 10 to either of the access openings 4, 5.

c) delivery of a magazine 2 containing a full complement of fuel rods from a selected one of the channels 10 to either of the access openings 13, 18.

d) receipt of an empty magazine 2 from any of the access openings 13, 18, 23, 25 and delivery of the magazine to a selected one of the channels 10.

The following description relates to a sequence in which the magazine handling machine 29 receives a magazine 2 from the access opening 4 and delivers the magazine to an empty storage channel 10. The particular storage channel 10 to be accessed is at the extreme left hand end of the top row, as viewed in FIGS. 3 and 5.

Further sequences are described in which the machine 29 removes a full magazine 2 from a storage channel 10 and delivers the magazine to the access openings 13 and 18 so that the fuel rods can be assembled to form nuclear fuel assemblies.

Figure 2:
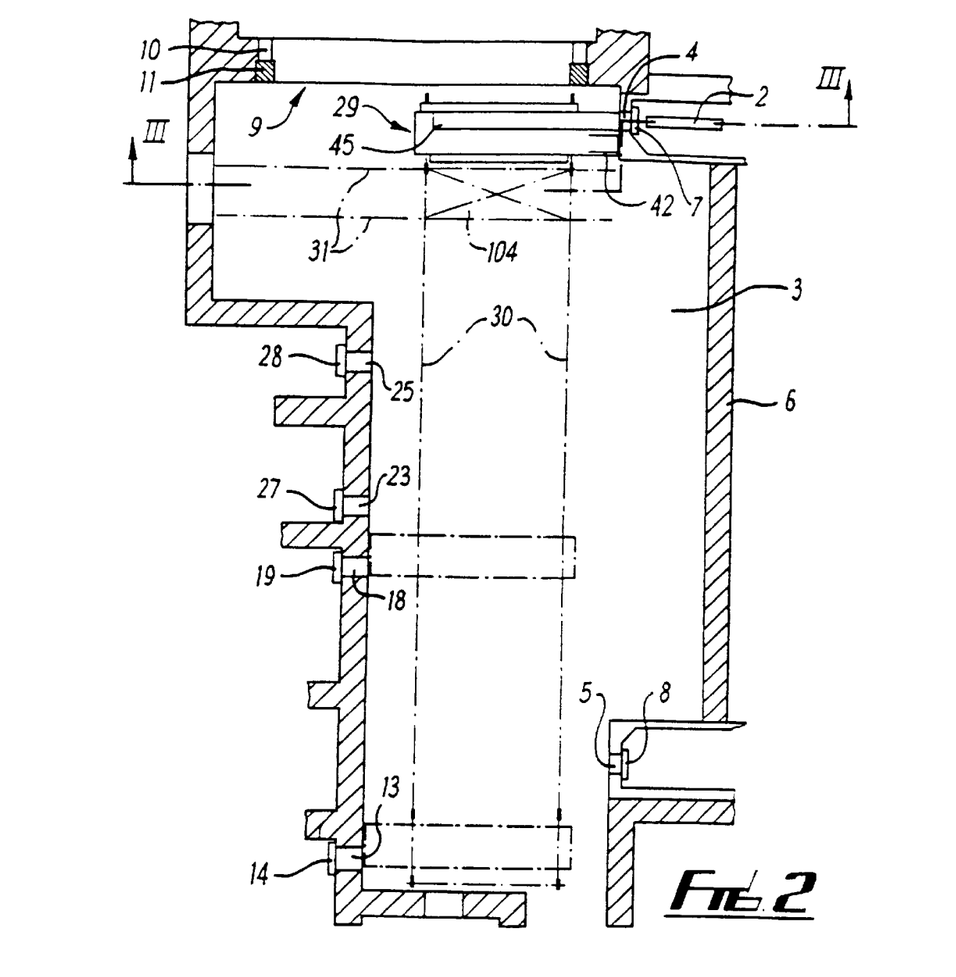
FIG. 2 is a plan view of a magazine handling and storage area shown in FIG. 1.
Figure 3:
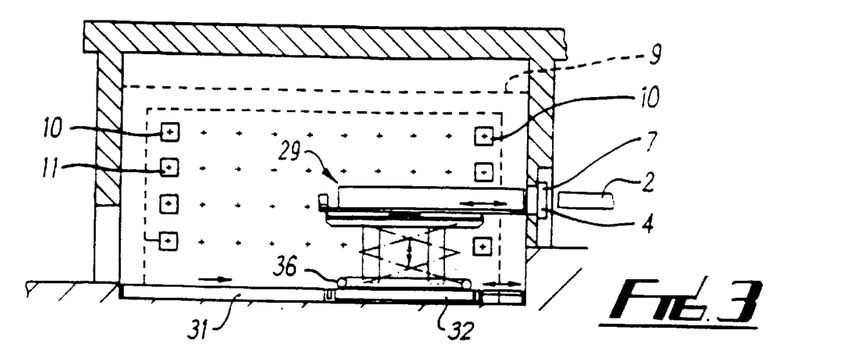
FIG. 3 is a cross-sectional elevation on the line III—III shown in FIG. 2.
Figure 4:
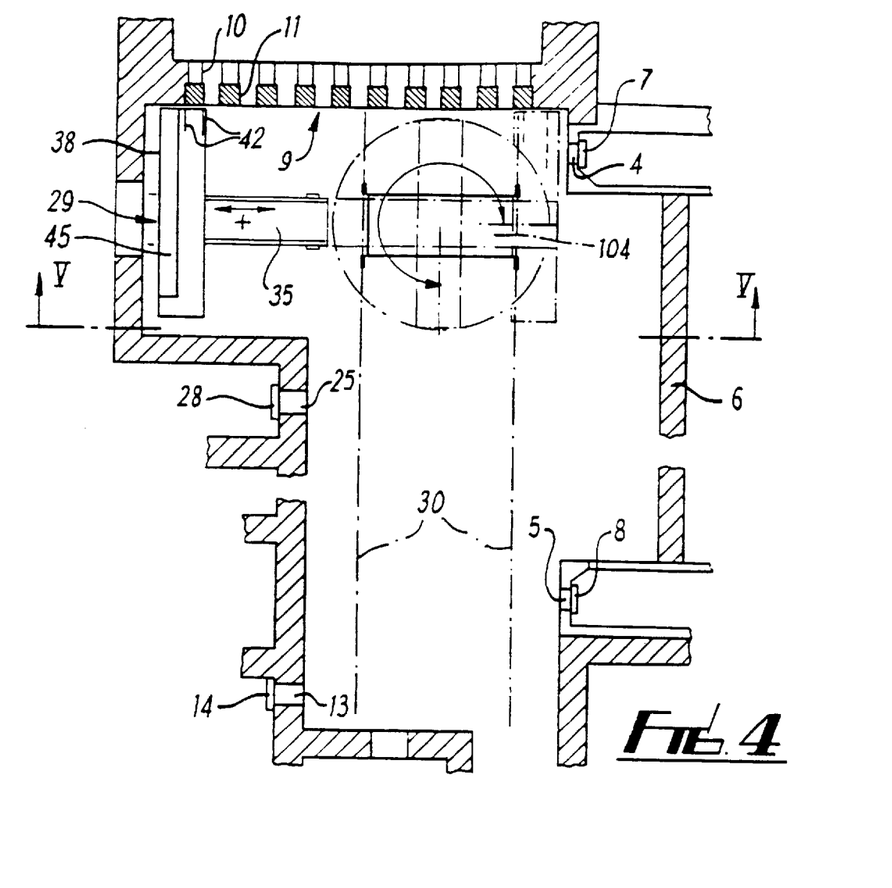
FIG. 4 is a further plan view of the magazine handling and storage area shown in FIG. 2.

For each of the sequences, the starting position for the magazine handling machine 29 is at a cross travel transfer position 104 which is located at the junction of the two pairs of rails 30, 31, as seen in FIGS. 1, 2 and 4. At the transfer position 104 the machine 29 is arranged in a transport condition in which the upper table 38 is aligned with the lower bogie and is at its lowest position. The motor 34 is operated to drive the wheels 33 so that the handling machine 29 moves along the rails 30 to the position shown in FIG. 2. When in this position, the upper table 38 is raised so that the magazine housing 45 is brought into alignment with the access opening 4, as shown in FIG. 3. The upper table 38 is then moved towards the access opening 4 so that the location dowels 48 register with holes (not shown) provided below the opening. By operation of the docking mechanism 49 a latch forming part of this mechanism engages with a catch (not shown) positioned below the opening to lock the machine 29 in position. After opening the door 7, the magazine removal and latch operating mechanism 46 is actuated so that the latch 47 is advanced into the magazine 2 through the slot 67 (see FIGS. 8 and 9). Further operation of the latch operating mechanism 46 causes rotation and then retraction of the latch 47 so that the magazine is pulled through the access opening 4 and withdrawn completely into the magazine housing 45. The access door 7 then closes the access opening 4. After unlocking the docking mechanism 49, the upper table 38 is retracted from the access opening 4 and then lowered so that the magazine handling machine 29 attains its transport condition. The handling machine 29 is then driven along the rails 30 to return to the transfer position 104.

Figure 5:
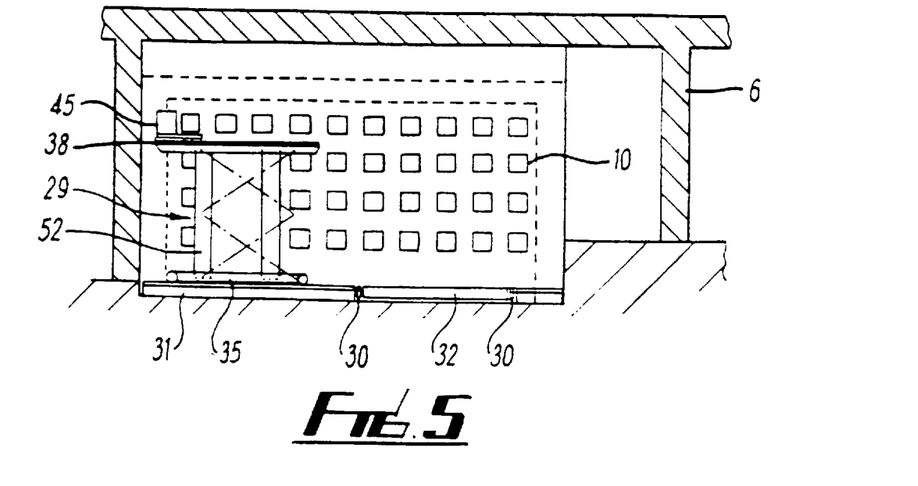
FIG. 5 is a cross-sectional elevation on the line V—V shown in FIG. 4.

The upper table 38 is then rotated through 90° by means of the motor 39 so that the open front end of the magazine housing 45 faces the store 9, as seen in FIG. 6. After unlocking the upper bogie 35 from the lower bogie 32, the wheels 36 are driven so that the upper bogie 35 travels along the rails 37 on the lower bogie. Movement of the upper bogie continues so that the wheels 36 transfer from the rails 37 to the rails 31. The movement of the upper bogie 35 is stopped when it reaches a position at which the guide bars 42 are below the channel 10 selected to be accessed. At this position the upper table 38 is raised so as to align the guide bars 42 with the guide bars 76 in the recess 70 of the channel, as shown in FIG. 5. The upper table 38 is then moved forwardly towards the plug 11 so that the location dowels 48 register with the holes 50 and the docking mechanism 49 engages with the catch device 51.

The plug removal and latch operating mechanism 43 is operated to advance the latch 44 into the plug locking mechanism 80 provided in the plug 11. The latch 44 is disposed so that the latch member 88 passes through the horizontal slot 87, enabling the square end 90 of the shaft 89 to enter the hole 91 of the pinion 92. Rotation of the shaft 89 through 90° in a clockwise direction, as viewed in FIG. 12, causes rotation of the pinion 92 which, in turn, effects linear movement of the upper and lower racks 94, 95 in mutually opposite directions. Thus, the catches 96, 97 are withdrawn into the plug 11 from their associated receiving holes in the recess 70, thereby releasing the plug 11. With the latch member now located behind the front plate 82 the latch operating mechanism 43 is operated to withdraw the plug 11 from the recess 70. The guide rollers 77, 78 run along the guide bars 76 in the recess 70 and then onto the guide bars 42 so that the plug 11 is withdrawn onto the upper table 38. It will be apparent that in this particular sequence the magazine 2 shown in FIG. 11 is not present. After actuation of the docking mechanism 49 to disengage the upper table 38 from the catch device 51, the upper table 38 is retracted. Movement of the upper bogie 35 along the rails 31 towards the transfer position 104 brings the open front end of the magazine housing 45 into alignment with the channel 10 from which the plug 11 has been removed. The upper table 38 is then extended so that the location dowels 48 re-enter the holes 50 and the docking mechanism 49 re-engages with the catch device 51.

Operation of the magazine removal and latch operating mechanism 46 is initiated so that the magazine 2 is pushed into the channel 10. When the rear end of the magazine just inside the recess 70 the latch 47 is rotated to actuate the latch assembly 66, resulting in the extension of catch 68a beyond the upper surface of the magazine 2, whereby the magazine is locked in the recess 70. Further rotation of the latch 47 enables this latch to be withdrawn through the slot 67 into the magazine housing 45, leaving the magazine 2 locked in the channel 10. The upper table 38 is then uncoupled from the catch 51 by operation of the docking mechanism 49 and then retracted. Movement of the upper bogie 35 along the rails 31 in a direction away from the transfer position 104 brings the guide bars 42 into alignment with the channel 10. Forward movement of the upper table 38 enables the location dowels 48 to register with the holes 50 and the docking mechanism 49 to be engaged with the catch device 51.

Operation of the plug removal and latch operating mechanism 43 then causes the transfer of the plug 11 from the guide bars 42 so that the magazine locating pins 103 register with the location holes 69 in the magazine 2. Simultaneously, the spindle member 101 passes into the latch assembly 66 through the slot 67 so that the plug is coupled to the magazine. The latch operating mechanism 43 is then further operated to rotate the shaft 89 in an anti-clockwise direction, as viewed in FIG. 12. This rotation is transmitted through the pinion 92, the driven shaft 98 and the coupling 100 to cause rotation of the lock spindle 99. This results in the retraction of the catch 68a to unlock the magazine 2 from the recess 70. By means of the latch operating mechanism 43 the plug 11 and the magazine 2, now coupled together, are pushed further into the channel 10 until the plug locates against the shoulder 71, as shown in FIG. 11. Further rotation of the shaft 89 causes the catches 96, 97 to extend into their associated receiving holes by rotation of the pinion 92 and the linear movement of the upper and lower racks 94, 95. Simultaneously, rotation of the lock spindle 99 causes the catch 68 to extend into the receiving hole. Thus, the plug 11 and the magazine 2 are locked in the channel 10. In this position, the location of the latch member 88 is such that it can be withdrawn through the vertical slot 86, enabling the latch 44 to be withdrawn into the plug housing 42.

The upper table 38 is released from the catch 51 by operation of the docking mechanism 49, retracted and then lowered to its lower position. The upper bogie 35 is driven along the rails 31 to run onto the rails 37 provided on the lower bogie 32, which is located at the cross travel transfer position 104. When the upper bogie 35 is in position on the lower bogie 32 and locked thereto, the upper table 38 is rotated so as to be aligned with the lower bogie 32. The handling machine 29 thus returns to its transport condition to complete the sequence.

When a complete array of fuel rods is required for forming into a fuel assembly, the magazine handling machine 29 is instructed to retrieve a magazine 2 containing a full complement of fuel rods from a channel 10. The handling machine 29 is then delivered to the access opening 13. This procedure is essentially a reversal of the procedure described above. Again, the procedure begins with the magazine handling machine 29 positioned at the cross travel transfer position 104 and arranged in its transport condition. In brief, the procedure includes operating the handling machine 29 so that the guide bars 42 are positioned to receive a plug 11 at the channel 10 containing the magazine 2 to be retrieved. The plug 11 is unlocked from the recess 70 and withdrawn onto the guide bars 42, the magazine 2 being drawn forwardly by the plug 11 coupled thereto into the recess 70. After uncoupling the plug 11 from the magazine 2, the handling machine 29 is moved so as to align the magazine housing 45 with the channel 10, enabling the magazine 2 to be pulled into the housing 45. Re-alignment of the guide bars 42 with the guide bars 76 in the recess 70 of the channel 10 enables the plug 11 to be replaced in the recess 70 and then locked in position. After lowering the upper table 38, the upper bogie 35 is moved back onto the lower bogie 32 and the handling machine 29 is then returned to the transport condition. In this condition, the upper table 38 is in alignment with the lower bogie 32 with the open end of the magazine housing 45 facing towards the shielding wall 12. From the cross travel transfer position 104, the handling machine 29 runs along the rails 30 until the magazine housing 45 is in alignment with the access opening 13. The upper table 38 is then moved towards the access opening 13 so that the location dowels 48 register with receiving holes (not shown) provided below the opening. Operation of the docking mechanism 49 engages the upper table 38 with a catch device (not shown).

Figure 14:
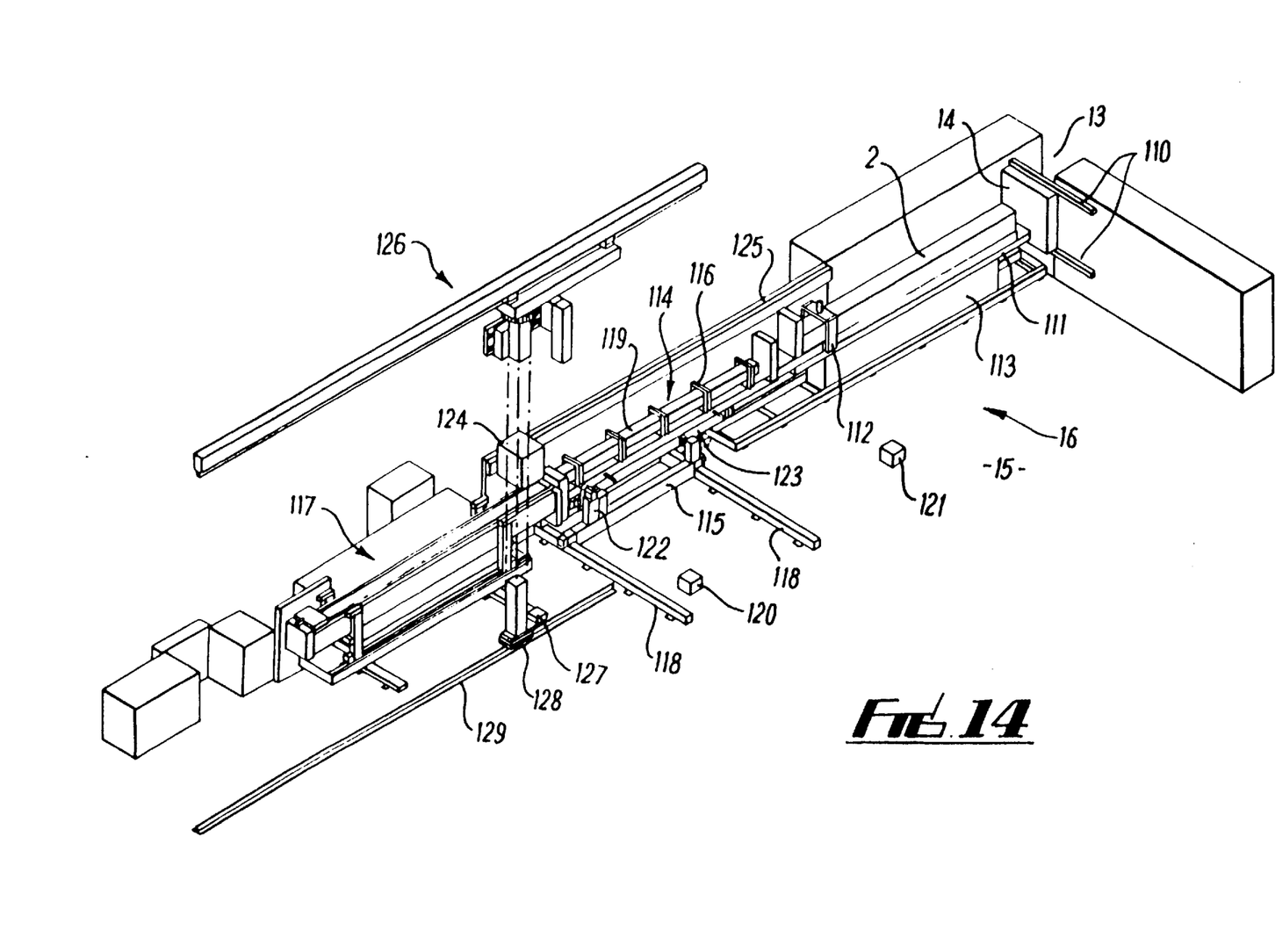
FIGS. 14 and 15 show isometric elevations of equipment for constructing fuel assemblies of a first type.

Referring now to FIG. 14, the fuel assembly line comprising construction equipment 16 suitable for constructing fuel assemblies for use in pressurised water reactors (PWRs) is shown in greater detail. Typically, a PWR fuel assembly comprises a square array of fuel rods and control rod guide tubes held in parallel relationship by spacer grids arranged at spaced locations along the fuel rods and secured to the guide tubes. Attached at opposite end of the guide tubes are top and bottom nozzles. To enable communication between the enclosure 15, which is surrounded by radiation shielding walls, and the handling and storage area 3, the door 14 is slidably arranged on a pair of guides 110. The equipment 16 includes a magazine table 111 which is arranged to receive a magazine 2 delivered through the access opening 13. A clamping device 112 is provided for securing the magazine 2 to the table 111. The table 111 is mounted for longitudinal movement on a platform 113 which houses a mechanism for operating the table.

A strongback 114 is provided for locating fuel assembly components, comprising spacer grids and guide tubes, the components being attached to an assembly bench 115 by a series of hinged clamps 116. A fuel rod pull loading machine 117 is installed adjacent an end of the assembly bench 115 remote from the platform 113. The assembly bench 115 is arranged to run on a pair of rails 118 to enable a partially constructed fuel assembly 119 to be presented to a bottom nozzle installation machine 120 and a top nozzle installation machine 121. Incorporated in the assembly bench 115 is a tilt mechanism 122 which operates to move a frame 123, forming part of the bench, to a vertical position.

In use, a strongback 114, complete with a fuel assembly components comprising spacer grids and guide tubes, is locked in place on the assembly bench 115. The components are secured to the strongback 114 by the hinged clamps 116 which are positioned so as to coincide with the spacer grids. In view of the hazards associated with handling mixed oxide fuel rods, all personnel must at this point in the procedure vacate the enclosure 15. All of the remaining operations are carried out under the control of operatives stationed at a remote location.

A magazine 2 containing a full complement of fuel rods is retrieved, as previously described, from a storage channel 10 by the magazine handling machine 29. By means of the docking mechanism 49 and the location dowels 48, the upper table 38 of the magazine handling machine 29 is docked to a catch device (not shown, but similar to the device 51 in FIG. 6) provided on the wall 12 at the access opening 13. The door 14 is opened and the magazine table 111 is moved from a park position through the access opening 13 and docked in a transfer position to receive the magazine 2. The handling machine 29, by means of the magazine removal and latch operating mechanism 46, advances the magazine 2 through the opening 13 onto the magazine table 111. After securing the magazine 2 to the magazine table 111 by the clamping device 112, the table 111 is moved from the transfer position back to the park position. The door 14 is then closed. A magazine holder on the table 111 is attached to the assembly bench 115 and the magazine door 61 (see FIG. 8) is opened. Operation of the pull loading machine 117 causes a number of pull rods to be advanced through the fuel assembly spacer grids and latched, one at a time, to the ends of a row of fuel rods in the magazine 2. On retracting the pull rods a row of fuel rods is pulled into the spacer grids. The height of the pull rods is adjusted and a further row of fuel rods is extracted from the magazine 2. This procedure is repeated until all of the rows of fuel rods have been installed in the fuel assembly. After closing the magazine door 61, the magazine table 111 and the pull loading machine 117 are returned to their respective park positions. An imaging inspection system 124 is moved along a guide rail 125 to enable a visual inspection at a remote location of the fuel rods and spacer grids.

The assembly bench 115 is then moved along the two rails 118 to a position at which the top and bottom nozzles can be fitted to the fuel assembly guide tubes. A bottom nozzle fitting tool is connected to the assembly bench 115 and the nozzle installation machine 120 is then operated to fit the bottom nozzle. After fitting the nozzle and removing the fitting tool, an imaging inspection system (not shown) similar to the inspection system 124 permits visual inspection of the fitted bottom nozzle. Similarly, a top nozzle is fitted to the guide tubes by the installation machine 121 followed by visual examination of the top nozzle fitting by the inspection system.

Figure 15:
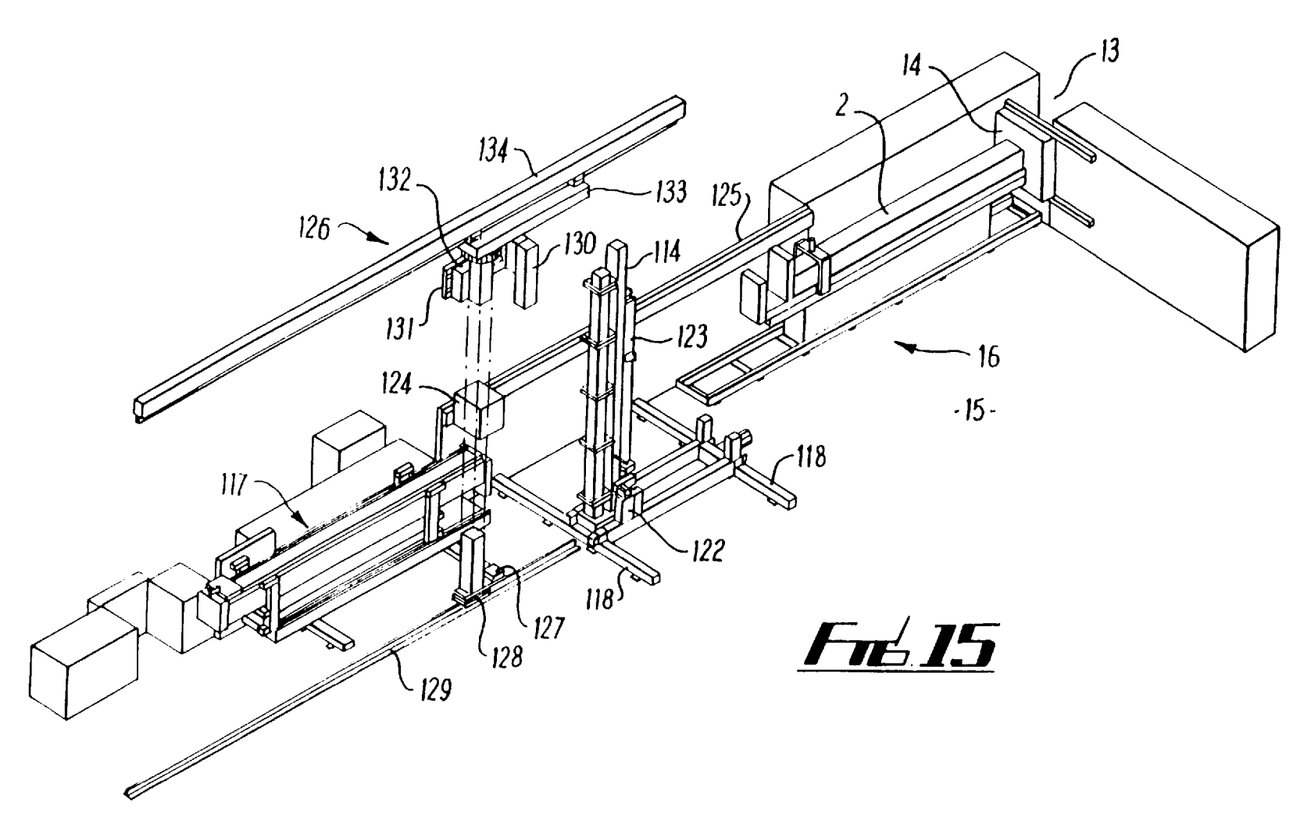

The assembly bench 115 is traversed along the two rails 118 to a position approximately mid-way along the rails. Operation of the tilt mechanism 122 serves to pivot the tilting frame 123, together with the strongback 114 and the fuel assembly 119 to a vertical position, as seen in FIG. 15. In this position the fuel assembly can be transferred to a fuel handler 126.

The fuel handler 126 comprises a lower support 127 mounted on a bogie 128 which runs along a track 129 extending along the floor. An upper support 130 is movably arranged on a mounting plate 131 which carries a drive mechanism 132. The drive mechanism 132 is operatively connected to a carriage 133 arranged to run along a guide rail 134. In operation, the fuel handler 126 is driven along the track 129 and the guide rail 134 towards the fuel assembly 119 so that the upper support 130 can be attached to the top nozzle of the assembly. After opening the clamps 116, the upper support 130 is moved along the mounting plate 131 so that the fuel assembly 119 is withdrawn from the strongback 114 into the fuel handler 126. The bottom nozzle of the fuel assembly is attached to the lower support 127 so that the assembly is securely mounted in the fuel handler. Movement of the fuel handler 126 along the track 129 enables the fuel assembly to be transferred to the inspection station 17 (see FIG. 1). The various components of the PWR fuel assembly construction equipment 16 are then returned to their original positions so that a further fuel assembly construction procedure can be carried out. After disconnection and retraction of the upper table 38 from the access opening 13, the magazine handling machine 29 is returned along the rails 30 to the cross travel transfer position 104.

Figure 16:
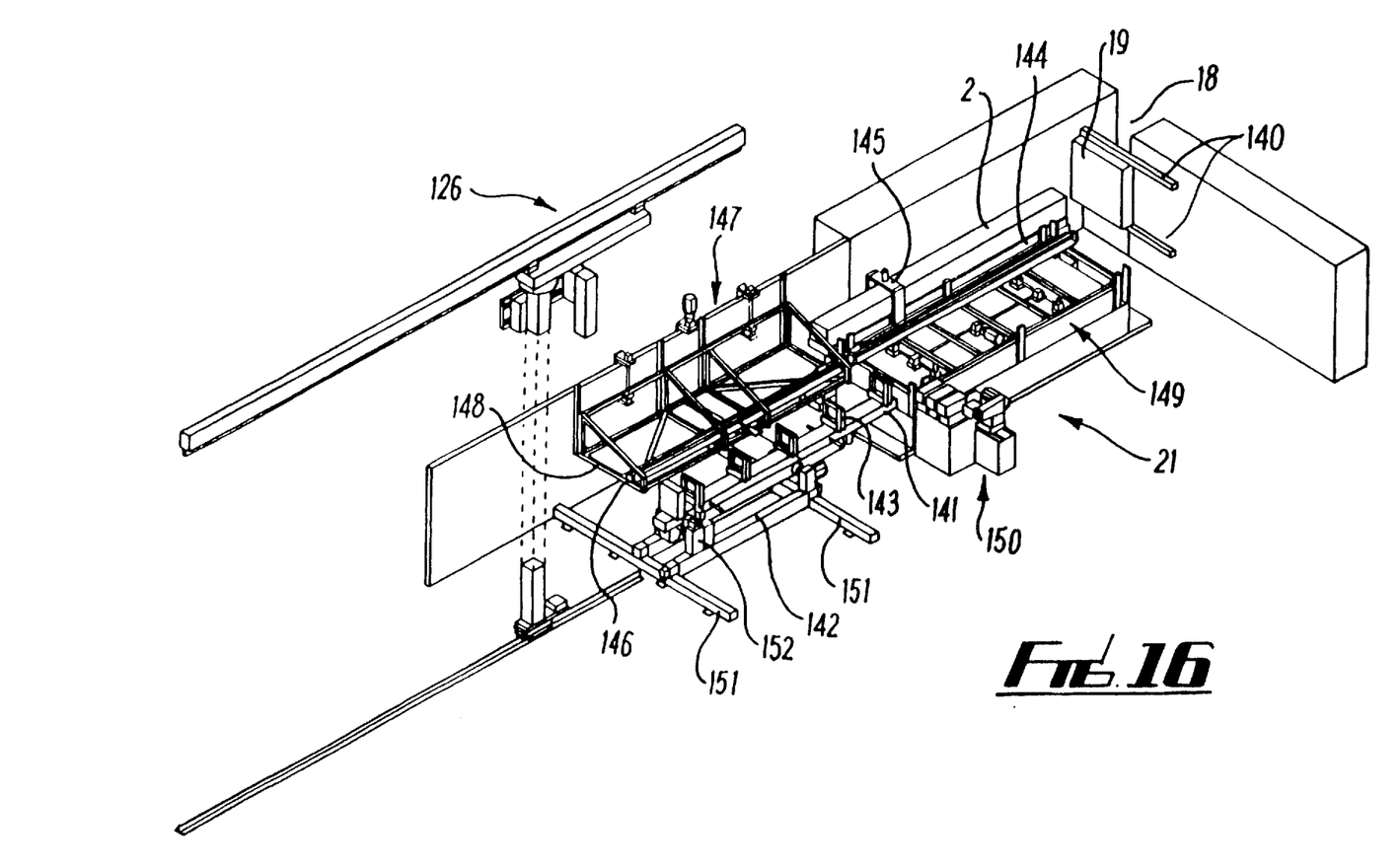
FIG. 16 shows an isometric elevation of equipment for constructing fuel assemblies of a second type.

The fuel assembly line comprising construction equipment 21 suitable for constructing fuel assemblies for use in boiling water reactors (BWRs) is shown in FIG. 16, to which reference is now made. A typical BWR fuel assembly comprises a square array of fuel rods held in parallel relationship by spacer grids at spaced locations along the fuel rods. The spacer grids are secured to a number of tie rods which are connected to and extend between top and bottom nozzles. The equipment 21 is accommodated in the enclosure 20 which is surrounded by radiation shielding walls to which access can be gained through the opening 18 by sliding the door 19 along a pair of guides 140.

A strongback 141, similar in construction to the strongback 114 described above, is locked in place on an assembly bench 142. Clamped in place on the strongback 141 by a series of hinged clamps 143 are BWR fuel assembly components comprising the spacer grids and the bottom nozzle. Before bringing mixed oxide fuel rods into the enclosure 20, all personnel must leave and the remaining operations are carried out under the control of operatives stationed at a remote location. A magazine 2 complete with fuel rods and tie rods is retrieved from the relevant storage channel 10 by the magazine handling machine 29, as described above. At the access opening 18 the upper table 38 of the machine 29 is docked, by means of the docking mechanism 49 and location dowels 48, to a catch device (similar to catch device 51) on the wall 12. The door 19 is opened and a magazine table 144 is moved from a park position through the access opening 18 and docked in a transfer position in readiness to receive a magazine 2. The magazine removal mechanism 46 advances the magazine 2 through the opening 18 onto the magazine table 144. After closing the door 19 and securing the magazine 2 by a clamping device 145, the table 144 is retracted and returned to the park position. With the magazine door 61 (see FIG. 7) open, a pulling head 146 forming part of a fuel rod transfer machine 147 is positioned so as to align with the magazine 2. The pulling head 146 grips a tie rod and withdraws it from the magazine onto a fuel rod transfer table 148. The pulling head 146 is moved laterally out of alignment with the magazine 2 and the tie rod is transferred to a push loader 149. After alignment of the push loader 149 with the fuel assembly skeleton, the push loader operates to push the tie rod into the spacer grids. This procedure is repeated until all of the tie rods have been inserted into the fuel assembly skeleton. The assembly bench 142 is then moved along a pair of rails 151 to a position in which a robot associated with a top nozzle station 150 is able to locate and operate a tie rod rotate device so as to screw all of the tie rods into the bottom nozzle.

The assembly bench 142 is returned along the rails 151 to the push loading position and the pulling head 146 is positioned for removing the fuel rods from the magazine 2. Each fuel rod is pulled from the magazine 2 onto the fuel rod transfer machine 147 by means of which the rods are transferred to the push loading machine 149. Each fuel rod is then pushed, one at a time, into the fuel assembly skeleton.

After opening the door 19, the magazine table 144 is advanced from a park position towards the opening 18 to a transfer position. The magazine 2 is engaged by the magazine removal mechanism 46 on the magazine handling machine 29 docked at the access opening 18. Operation of the mechanism 46 withdraws the magazine 2 into the magazine housing 45. The magazine table 144 is then moved to the park position and the door 19 is closed. After disconnection of the upper table 38 from the access opening 18, the magazine handling machine 29 is returned along the rails 30 to the cross travel transfer position 104.

Movement of the assembly bench 142 along the rails 151 so that an end of the fuel assembly is located in the vicinity of the top nozzle station 150, enables the expansion springs, the top nozzle and the tab washers to be attached. A visual inspection of the fuel assembly is then carried out using an imaging system (not shown) similar to the inspection system 124 shown in FIG. 15.

Following inspection of the fuel assembly, the assembly bench 142 is traversed along the two rails 151 to a fuel handler position at a location approximately midway along the rails. A tilt mechanism 152 on the assembly bench 142 is operated to pivot the fuel assembly to a vertical position so that the assembly can be transferred to a fuel handler 126. The fuel handler 126 is of similar construction and operates in a similar manner to that described above for handling the PWR fuel assembly. Thus, the fuel handler 126 serves to transfer the BWR fuel assembly to the inspection station 22 (see FIG. 1). The various components of the fuel assembly construction equipment 21 are returned to their original positions in readiness for the construction of a further fuel assembly.

We claim:

1. Apparatus for handling fuel rods for use in nuclear fuel assemblies, the apparatus comprising a store means (9) constructed from radiation shielding material and having a plurality of elongate channels (10) extending in parallel relationship, each of said channels (10) being adapted to receive a magazine (2) containing at least one fuel rod, and a remotely and automatically operated magazine handling means (29) operable to insert a magazine (2) into or to remove a magazine (2) from a selected one of said channels (10), characterised in that each of the channels (10) is closed at one end by a removable closure means (11) constructed from radiation shielding material and means (43) are provided on the magazine handling means (29) for removing the closure means from the selected channel (10) or inserting the closure means in the selected channel (10).

2. Apparatus according to claim 1, wherein the magazine handling means comprises a housing (45) constructed from radiation shielding material and adapted to accommodate a magazine (2).

3. Apparatus according to claim 1, wherein guide means (42) are provided on the magazine handling means (29) for receiving the closure means (11).

4. Apparatus according to claim 3, wherein the guide means (42) for receiving the closure means (11) comprises a pair of parallel guide bars, and wherein rollers (77, 78) are provided on the closure means (11) for running along the guide bars.

5. Apparatus according to claim 3, wherein a housing (45) and said guide means extend in parallel relationship, the housing having an open end adjacent to said guide means through which a magazine (2) can be inserted or removed.

6. Apparatus according to claim 1, wherein locking means (80) are provided on the closure means (11) for securing and releasing the closure means (11) in the channel (10), and wherein operating means (44) are provided on the magazine handling means (29) for actuating said locking means.

7. Apparatus according to claim 6, wherein the locking means comprises at least one catch (96, 96a, 97, 97a) extendible from an external surface of the closure means (11) to secure the closure means in the channel (10) and is retractable beneath said external surface to release the closure means from the channel, the catch being operatively connected to a rotatable toothed pinion (92), and operating means (95) being engageable with the pinion to cause rotation thereof whereby the catch can be extended and retracted.

8. Apparatus according to claim 4, wherein further guide means (76) are provided in the channel (10) to facilitate the removal and insertion of the closure means (11), the further guide means comprising a guide bar extending along the channel at each side thereof, and wherein the rollers (77, 78) provided on the closure means are arranged to run along the guide bars during removal and insertion of the closure means.

9. Apparatus according to claim 1, wherein coupling means (98, 99, 101) are provided on the closure means (11) whereby the closure means can be coupled to the magazine (2).

10. Apparatus according to claim 1, wherein the magazine (2) comprises an elongate casing of rectangular cross-section and having a closed end and an open end, the open end being normally closed by a door means (61).

11. Apparatus according to claim 9, wherein a latch assembly (66) is provided on the magazine (2) at the closed end thereof, the latch assembly being operated by the coupling means (98, 99, 101) associated with the closure means (11) whereby the magazine can be secured to or released from the channel (10).

12. Apparatus according to claim 1, wherein the magazine handling means (29) comprises a lower bogie (32) provided with a first set of wheels (33) adapted to run along a first pair of rails (30).

13. Apparatus according to claim 12, wherein the magazine handling means (29) comprises an upper bogie (35) provided with a second set of wheels (36) adapted to run along a second pair of rails (37) provided on the lower bogie (32), the second pair of rails extending substantially transversely with respect to said first pair of rails.

14. Apparatus according to claim 13, wherein a housing (45) and a guide means (42) are arranged on a table (38) mounted for rotation on the upper bogie (35).

15. Apparatus according to claim 14, wherein means (52) are provided on the magazine handling means (29) for raising and lowering the table (38) with respect to said lower bogie (32).

16. Apparatus according to claim 12, wherein the apparatus further comprises first and second substantially parallel radiation shielding walls (6, 12) defining a passage (3) therebetween, the first pair of rails (30) being arranged to run along said passage, and access openings (4, 5, 13, 18) provided in each of said first and second walls, the arrangement being such that the magazine handling means (29) is operable to run along the first pair of rails (30) and to present an open end of the housing (45) to an access opening in either of said first and second walls.

17. Apparatus according to claim 13, wherein a third pair of rails (31) is arranged transversely with respect to the direction of the first pair of rails (30), the third pair of rails (31) being adapted to receive the second set of wheels (36) provided on the upper bogie (35), whereby the magazine handling means (29) is operable to present an open end of the housing (45) to the channels (10) of the store means (9).

18. Apparatus according to claim 1, wherein the apparatus further includes a first fuel assembly line (16) comprising equipment for constructing fuel assemblies of a first type, a second fuel assembly line (21) comprising equipment for constructing fuel assemblies of a second type, and wherein the magazine handling means (29) is operable to remove a magazine (2) from a selected one of said channels (10) of the store means (9) and to deliver said magazine to either of said first and second fuel assembly lines.

19. Apparatus according to claim 18, wherein each fuel assembly line (16, 21) is arranged in a separate shielded enclosure (15, 20), each enclosure having an access opening (13, 18) normally closed by a door member (14, 19), catch means located adjacent the access opening and a docking mechanism (49) provided on the magazine handling means (29) and cooperable with the catch means whereby said handling means can be docked adjacent the access opening.

20. Apparatus according to claim 19, wherein a magazine removal means (46) is provided on said handling means (29), the removal means (46) being operable to advance a magazine (2) from the handling means and through the access opening (13, 18) into said shielded enclosure.

21. Apparatus according to claim 18, wherein at least one of said first and second fuel assembly lines (16, 21) comprises a table means (111, 144) movable towards said access opening (13, 18) whereby to receive a magazine (2) from said handling means (29).

22. Apparatus according to claim 21, wherein clamping means (112, 145) are provided on said table means (111, 144) for securing a magazine (2) thereto.

23. Apparatus according to claim 20, wherein each of said first and second fuel assembly lines (16, 21) includes a fuel rod pulling means (117, 146) operable to withdraw the fuel rods from said magazine (2).

24. Apparatus according to claim 23, wherein each of said first and second fuel assembly lines (16, 21) includes an assembly bench (115, 142) for supporting a plurality of fuel assembly components, said assembly bench comprising a plurality of clamp means (116, 143) for securing said components to the assembly bench.

25. Apparatus according to claim 23, wherein the fuel rod pulling means (117) associated with one of said first and second fuel assembly lines (16) is operable to withdraw the fuel rods from the magazine (2) into said fuel assembly components.

26. Apparatus according to claim 25, wherein the fuel rod pulling means (146) associated with the other of said first and second fuel assembly lines (21) is operable to withdraw the fuel rods from the magazine (2) onto a fuel rod transfer means (148) which is operable to transfer the fuel rods to a pushing machine (149) by means of which said fuel rods are pushed into said fuel assembly components.

27. Apparatus according to claim 24, wherein each of the assembly benches (115, 146) includes a pivotably mounted support to which the fuel assembly components are secured, the pivotably mounted support being operable to move said fuel assembly components to a vertical orientation.

28. Apparatus according to claim 27, wherein at least one of said first and second fuel assembly lines (16, 21) includes a fuel handling machine (126) for receiving fuel assembly components in a vertical orientation from said pivotably mounted support, the fuel handling machine comprising an upper support means (130) and a lower support means (127) for engaging said fuel assembly components, each of said upper and lower support means being arranged to run along associated track means (134, 129).

29. Apparatus according to claim 1, wherein the fuel rods comprise a fuel material formed from a mixture of uranium and plutonium oxides.

* * * * *